(12) United States Patent
Motoyama et al.

(10) Patent No.: US 8,069,241 B2
(45) Date of Patent: *Nov. 29, 2011

(54) METHOD AND APPARATUS UTILIZING PROTOCOL HIERARCHY TO CONFIGURE OR MONITOR AN INTERFACE DEVICE

(75) Inventors: Tetsuro Motoyama, Cupertino, CA (US); Avery Fong, Castro Valley, CA (US)

(73) Assignee: Ricoh Company, Limted, Tokyo (JP)

( * ) Notice: Subject to any disclaimer, the term of this patent is extended or adjusted under 35 U.S.C. 154(b) by 900 days.

This patent is subject to a terminal disclaimer.

(21) Appl. No.: 11/960,248

(22) Filed: Dec. 19, 2007

(65) Prior Publication Data

US 2008/0098097 A1 Apr. 24, 2008

Related U.S. Application Data

(63) Continuation of application No. 10/068,861, filed on Feb. 11, 2002, now Pat. No. 7,337,242.

(51) Int. Cl.
*G06F 11/30* (2006.01)
(52) U.S. Cl. ......... 709/224; 709/221; 709/220; 709/230
(58) Field of Classification Search .................. 709/224, 709/220–222, 230
See application file for complete search history.

(56) References Cited

U.S. PATENT DOCUMENTS

| | | | |
|---|---|---|---|
| 5,818,603 A | 10/1998 | Motoyama | |
| 5,819,107 A | 10/1998 | Lichtman et al. | |
| 5,832,191 A | 11/1998 | Thorne | |
| 5,951,684 A | 9/1999 | Jeon, II | |
| 6,003,097 A | 12/1999 | Richman et al. | |
| 6,330,628 B1 | 12/2001 | Motoyama | |
| 6,430,711 B1 | 8/2002 | Sekizawa | |
| 6,668,376 B1 | 12/2003 | Wang et al. | |
| 6,757,714 B1 | 6/2004 | Hansen | |
| 6,795,829 B2 | 9/2004 | Alsop et al. | |
| 6,801,331 B1 | 10/2004 | Motoyama | |
| 6,839,717 B1 | 1/2005 | Motoyama et al. | |
| 6,925,571 B1 | 8/2005 | Motoyama et al. | |
| 6,948,175 B1 | 9/2005 | Fong et al. | |

(Continued)

FOREIGN PATENT DOCUMENTS

JP 2-172348 7/1990

OTHER PUBLICATIONS

U.S. Appl. No. 09/108,705, filed Jul. 1, 1998, Motoyama.

(Continued)

*Primary Examiner* — Kenneth R Coulter
(74) *Attorney, Agent, or Firm* — Oblon, Spivak, McClelland, Maier & Neustadt, L.L.P.

(57) ABSTRACT

A method and apparatus for establishing a communication means for an interfacing device that utilizes a communication means hierarchy to decipher a communication means to be used by other hardware devices so that they may operative cooperatively. Particularly, a controlling device queries an interfacing device for the manufacturer of the interfacing device. If the manufacturer is determinable, then the controlling device queries the interfacing device for the model of the interfacing device. This querying for the model utilizes the identity of the manufacturer by using communication means that are particular to the manufacturer to query the interfacing device. Based on the information queried from the interfacing device, the controlling device is able to decipher the best known communication means for the interfacing device.

21 Claims, 11 Drawing Sheets

U.S. PATENT DOCUMENTS

| | | | |
|---|---|---|---|
| 6,967,734 B1 * | 11/2005 | Wang et al. | 358/1.15 |
| 7,181,619 B2 | 2/2007 | Motoyama et al. | |
| 7,194,537 B2 | 3/2007 | Motoyama et al. | |
| 7,209,952 B2 | 4/2007 | Fong et al. | |
| 7,289,995 B2 | 10/2007 | Motoyama et al. | |
| 7,296,079 B2 | 11/2007 | Motoyama et al. | |
| 7,302,469 B2 | 11/2007 | Motoyama et al. | |
| 7,337,242 B1 * | 2/2008 | Motoyama et al. | 710/8 |
| 2001/0029534 A1 * | 10/2001 | Spinks et al. | 709/224 |
| 2002/0099787 A1 * | 7/2002 | Bonner et al. | 709/216 |
| 2002/0152292 A1 | 10/2002 | Motoyama et al. | |
| 2002/0161867 A1 | 10/2002 | Cochran et al. | |
| 2003/0055953 A1 | 3/2003 | Motoyama et al. | |
| 2003/0167323 A1 | 9/2003 | Motoyama et al. | |
| 2003/0177227 A1 | 9/2003 | Motoyama et al. | |
| 2004/0128365 A1 | 7/2004 | Motoyama et al. | |
| 2004/0139183 A1 | 7/2004 | Motoyama et al. | |
| 2004/0205207 A1 | 10/2004 | Motoyama et al. | |
| 2004/0254915 A1 | 12/2004 | Motoyama et al. | |
| 2004/0255014 A1 | 12/2004 | Motoyama et al. | |
| 2004/0255021 A1 | 12/2004 | Motoyama et al. | |
| 2004/0255023 A1 | 12/2004 | Motoyama et al. | |
| 2005/0071444 A1 | 3/2005 | Motoyama | |
| 2005/0071483 A1 | 3/2005 | Motoyama | |
| 2005/0165926 A1 | 7/2005 | Motoyama et al. | |
| 2005/0165927 A1 | 7/2005 | Motoyama et al. | |
| 2005/0177642 A1 | 8/2005 | Motoyama et al. | |
| 2005/0240939 A1 | 10/2005 | Motoyama et al. | |
| 2005/0246425 A1 | 11/2005 | Motoyama et al. | |
| 2005/0246426 A1 | 11/2005 | Motoyama et al. | |
| 2005/0246437 A1 | 11/2005 | Motoyama et al. | |
| 2005/0246439 A1 | 11/2005 | Fong et al. | |
| 2005/0256934 A1 | 11/2005 | Motoyama | |
| 2005/0262202 A1 | 11/2005 | Motoyama et al. | |
| 2005/0278428 A1 | 12/2005 | Motoyama et al. | |
| 2005/0278442 A1 | 12/2005 | Motoyama et al. | |
| 2007/0041545 A1 * | 2/2007 | Gainsboro | 379/188 |
| 2007/0124455 A1 | 5/2007 | Motoyama et al. | |
| 2007/0150543 A1 | 6/2007 | Fong et al. | |
| 2008/0028091 A1 | 1/2008 | Motoyama et al. | |
| 2010/0250452 A1 * | 9/2010 | Moran et al. | 705/304 |

OTHER PUBLICATIONS

U.S. Appl. No. 09/953,357, filed Sep. 17, 2001, Motoyama.
U.S. Appl. No. 10/162,402, filed Jun. 5, 2002, Motoyama.
U.S. Appl. No. 10/225,290, filed Aug. 22, 2002, Motoyama.
U.S. Appl. No. 11/517,363, filed Sep. 8, 2006, Motoyama, et al.
U.S. Appl. No. 11/517,430, filed Sep. 8, 2006, Motoyama, et al.
U.S. Appl. No. 11/517,362, filed Sep. 8, 2006, Motoyama, et al.
U.S. Appl. No. 11/517,378, filed Sep. 8, 2006, Motoyama, et al.
U.S. Appl. No. 11/517,428, filed Sep. 8, 2006, Motoyama, et al.
U.S. Appl. No. 11/940,785, filed Nov. 15, 2007, Motoyama, et al.
U.S. Appl. No. 12/015,659, filed Jan. 17, 2008, Motoyama, et al.
U.S. Appl. No. 12/030,623, filed Feb. 13, 2008, Motoyama, et al.
U.S. Appl. No. 12/062,146, filed Apr. 3, 2008, Motoyama, et al.
U.S. Appl. No. 12/888,134, filed Sep. 22, 2010, Motoyama, et al.

* cited by examiner

METHOD AND APPARATUS UTILIZING PROTOCOL HIERARCHY TO CONFIGURE OR MONITOR AN INTERFACE DEVICE

CROSS REFERENCES TO RELATED APPLICATIONS

The present continuation application claims the benefit of priority under 35 U.S.C. §120 to application Ser. No. 10/068,861, now U.S. Pat. No. 7,337,242, filed on Feb. 11, 2002, which is incorporated herein by reference. The present application is related to commonly owned U.S. patent application Ser. No. 09/756,120, now abandoned, filed Jan. 9, 2001, entitled "Method and System of Remote Support of Device Using Email," which is incorporated herein by reference.

BACKGROUND OF INVENTION

1. Field of Invention

The present invention is related to monitoring, configuration or installation of hardware on a computer system.

2. Discussion of the Background

In general, computer systems include hardware and software. Hardware is the actual physical computing machinery, while software is the list of instructions to operate the hardware. Typically, computer systems will include a variety of hardware devices that interface with one another. When hardware devices interface with one another, it is necessary for the software which operates the hardware to be configured to allow communication between the hardware devices, so that the hardware devices can operate cooperatively. It is also desirable for hardware devices to be monitored. For the purposes of discussion, a hardware device that is configuring or monitoring will be referred to as a controlling device. Likewise, for the purposes of discussion, the hardware device that is being configured to operate cooperatively or being monitored by the controlling device will be referred to as an interfacing device.

When hardware devices initially interface with one another, it is common for the software that operates the devices to not be configured to allow cooperative operation. Accordingly, a significant part of installing computer hardware devices together is configuring the software. In some arrangements, a user must configure the computer hardware manually by opening the computer hardware and physically setting jumpers or dip switches. In some arrangements, the installation process includes a user loading software from a floppy disk to configure the hardware devices. There have also been attempts for computer hardware devices to include software that can automatically configure hardware devices. However, there are some apparent disadvantages and deficiencies of these attempts.

One disadvantage is that automatic hardware installation software is limiting in its ability to adapt to new devices or to new manufacturers that were not specifically programmed into the software. In the prior art, if the controlling device does not recognize the specific model of the interfacing device, automatic configuration is not possible. In other words, in the prior art, if the controlling device is not programmed to anticipate the model of an interfacing device, then automatic hardware configuration will not be successful. In such a circumstance, a user will have to manually install the configuration communication means to the hardware devices.

Another disadvantage of the prior art is that the controlling device is unable to partially configure hardware devices if the particular model of the interfacing device cannot be identified. In other words, if a controlling device cannot identify a specific model of the interfacing device, then the interfacing device will not be configured to operate cooperatively. This results in the unconfigured interfacing device being inoperable and essentially useless.

For hardware devices that are located on a network, it is desirable for these devices to be monitored for maintenance, usage, or other purposes. However, it has been difficult for a controlling device to communicate with various interfacing devices on a network given the different communication means between manufacturers and models of interfacing devices. This disadvantage is problematic, as administrators of networks are unable to obtain crucial information about the performance and efficiency of interfacing devices on a network.

SUMMARY OF THE INVENTION

Accordingly, it is the object of the present invention to provide a method and apparatus that overcomes the above-mentioned deficiencies of the prior art. The present invention relates to a method for a controlling device to operate cooperatively with an interfacing device. In general, the controlling device is a computer hardware device which communicates with the interfacing device. The interfacing device is also an office device, such as a printer, scanner, digital copier, stamp machine, or household appliances. The controlling device queries the interfacing device for the identity of the manufacturer of the interfacing device. Based on the determined identity of the manufacturer of the interfacing device, the controlling device then queries the interfacing device for the identity of the model of the interfacing device. Based on the information queried from the interfacing device, the controlling device establishing a communication with the interfacing device by creating software objects through the software factory.

This method is a hierarchical approach for establishing a communication means between a hardware device and an interfacing device. This hierarchical approach is advantageous, as once the manufacturer of the interfacing device is determined by the controlling device, the controlling device can determine the model of the interfacing device using communication means that are specific to the identified manufacturer of the interfacing device, according to an embodiment of the invention. In other words, once the controlling device determines the manufacturer of the interfacing device, knowledge of specific manufacturer can be taken advantage of to determine the model of the interfacing device.

One advantage of this hierarchical approach is that it is an effective mechanism establishing the most effective communication means between the controlling device and the interfacing device. This is evident and apparent, as once the controlling device has identified the manufacturer of the interfacing device, it is possible for the controlling device to determine the model-specific communication means of the interfacing device. In other words, once the manufacturer of the interfacing device is identified, the controlling device has enough information about the interfacing device to decipher the model of the interfacing device. This advantage is significant, as it offers some versatility as to how the controlling device determines the actual model of the interfacing device.

In some instances, the model of the interfacing device may be readily identified from a query of the interfacing device and using such information from a query, the controlling device can establish a communication means according to communication means that are specific to the identified model of the interfacing device.

In other instances, the controlling device may not be able to identify the model of the interfacing device through a query of the interfacing device. In such instances, the controlling device of the present invention can then employ alternative means for establishing an effective communication means. One such means is electronically communicating with the manufacturer of the interfacing device and downloading updated software communication means and model identification codes. In such an arrangement, a controlling device, with updated manufacturer information, can then successfully re-query the interfacing device for the specific model.

In other instances, the controlling device may not be able to communicate electronically with the manufacturer of the interfacing device. However, in these instances, the controlling device may be able to decipher the communication means of the interfacing device by trying the use of other communication means of other models from the manufacturer of the interfacing device. This would be a trial and error process and may result in a compromise of the maximum configurability of the interfacing device, but would deem the interfacing device operable or monitorable.

In all of these arrangements, the manufacturer of the interfacing device must be known. This is apparent, as there are so many manufacturers and so many models of interfacing devices that it would not be possible or practical to decipher the communication means of the interfacing device without some additional information about the interfacing device, such as the manufacturer.

Another advantage of the present invention is the ability of the controlling device to adapt to the communication means used with an interfacing device. In an instance when either the manufacturer or model of the interfacing device cannot be determined, the controlling device may be able to use communication means that are universal to all devices. Alternatively, if the manufacturer is identifiable but the model is not, then the controlling device can utilize communication means that are specific to all devices of the identified manufacturer. Alternatively, it is common that hardware devices have basic universal features, which all hardware devices of that type have and all utilize the same communication means. Accordingly, the controlling device of the present invention can utilize these universal features using a standard communication means, according to an embodiment of the invention. Taking this one step further, all devices of a particular manufacturer may have some special features that are specific to that manufacturer. These features may all share the same communication means regardless of the specific model. If the controlling device is able to identify the manufacturer of the interfacing device, then the controlling device can maximize communication, even without specific model identification of the interfacing device. Of course, if a model of a particular interfacing device is determinable, the controlling device will be able to identify all of the communication means associated with that specific model of interfacing device.

Accordingly, the present invention is an improvement over the prior art, as the controlling device is able to maximize the effectiveness of the communication means with the interfacing device by taking advantage of the information the controlling device can obtain from the interfacing device to establish a communication means.

The present invention also has the advantage of being self-teaching or a smart device. As a controlling device interacts with interfacing devices, the controlling device is able to learn the nature of communication means of a particular manufacturer or a particular class of interfacing device models. The controlling device may be able to decipher several communication means from the interfacing device by a trial and error process of probing the interfacing device. This advantage allows maximization of the established communication means of interfacing devices, even when a manufacturer or model of interfacing devices cannot be easily identified.

BRIEF DESCRIPTION OF THE DRAWINGS

A more complete appreciation of the present invention and many of the attendant advantages thereof will be readily obtained as the same becomes better understood by reference of the following detailed description when considered in connection with the accompanying drawings.

DETAILED DESCRIPTION OF THE PREFERRED EMBODIMENTS

Figure 1:
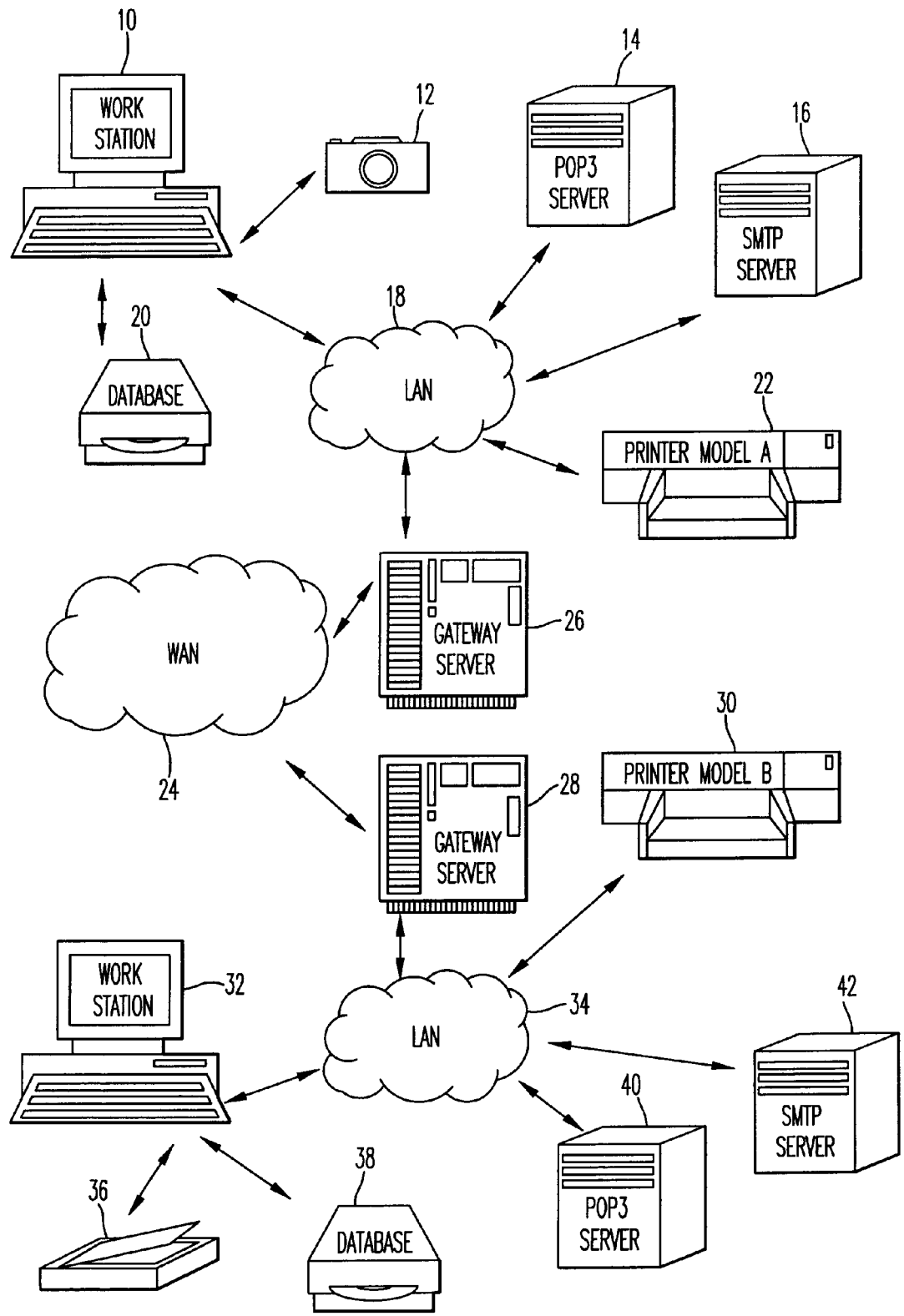
FIG. 1 illustrates the relationship between a plurality of hardware devices and computer networks.

Embodiments of the present invention relate to a method for a controlling device to establish a communication means for an interfacing device. The method comprises the following steps: Realizing the location of the interfacing device. Updating in the first database the location of the interfacing device. Querying the interfacing device for the identity of the manufacturer of the interfacing device. Updating in the first database the manufacturer of the interfacing device, if the querying for the manufacturer of the interfacing device is successful. Querying the interfacing device, utilizing the identity of the manufacturer, for the identity of the model of the interfacing device, if the querying of the interfacing device for the identity of the manufacturer of the interfacing device is successful. Updating in the first database the identity of the model of the interfacing device, if the query for the identity of the model of the interfacing device is successful. Establishing a communication means for the interfacing device according to information stored in the first database.

In embodiments of the present invention, if the querying of the interfacing device for the identity of the manufacturer of the interfacing device is successful and the querying of the interfacing device for the identity of the model of the interfacing device is unsuccessful, then the step of establishing a communication means for the interfacing device is according to an interfacing protocol that is particular to all devices manufactured by the manufacturer of the interfacing device.

In embodiments of the present invention, if the querying of the interfacing device for the identity of the manufacturer of the interfacing device is unsuccessful and the querying of the interfacing device for the identity of the model of the interfacing device is unsuccessful, then the step of establishing a communication means for the interfacing device is according to an interfacing protocol that is common to all devices.

In embodiments of the present invention, the step of querying the interfacing device for the identity of the model of the interfacing device utilizes the identity of the manufacturer of the interfacing device to query the interfacing device with model identification codes that are particular to the manufacturer of the interfacing device.

In embodiments of the present invention, the method comprises a further step of querying the interfacing device with a unique identification of the interfacing device prior to the step of querying the interfacing device for the identity of the manufacturer of the interfacing device.

In embodiments of the present invention, the unique identification of the interfacing device is a unique sequence of data designated to the interfacing device by the manufacturer of the interfacing device.

In embodiments of the present invention, the step of updating in the first database the location of the interfacing device includes updating a unique identification of the interfacing device in the first database.

In embodiments of the present invention, interfacing device is queried using simple network management protocol.

In embodiments of the present invention, the step of realizing the location of the interfacing device is accomplished by automatically detecting that the interfacing device is electrically coupled to the controlling device.

In embodiments of the present invention, the step of realizing the location of the interfacing device is accomplished by an input by a user.

In embodiments of the present invention, the controlling device and the interfacing device are network computer devices coupled to one another by a network. In embodiments of the present invention the step of realizing the location of the interfacing device is accomplished by the controlling device detecting that the network location of the interfacing device has changed. In embodiments of the present invention the location of the interfacing device is a network location of the interfacing device on the network. In embodiments of the present invention the network location of the interfacing device is an internet address.

In embodiments of the present invention, the first database can be accessed by an interfacing that is independent of the database file format. In embodiments of the present invention, the first database complies with the ODBC standard.

In embodiments of the present invention, at least a portion of the first database is duplicated on a second database.

In embodiments of the present invention, the second database is updated with at least a portion of the first database by utilizing transfer through email. In embodiments of the present invention, the transfer data through e-mail utilizes a simple mail transfer protocol.

Embodiments of the present invention relate to a method for a controlling device to establish a communication means for an interfacing device. The method comprising the following steps: Querying the interfacing device for an identity of a manufacturer and the identity of the model of the interfacing device. Establishing a communication means for the interfacing device using a communication means that is common to all interfacing devices if the querying of the interfacing device did not identify either the manufacturer and the model of the interfacing device. Establishing a communication means for the interfacing device using a communication means that is common to all interfacing devices of the manufacturer if the querying of the interfacing device identified the manufacturer of the interfacing device and the querying of the interfacing device did not identify the model of the interfacing device. Establishing a communication means for the interfacing device using a communication means that is particular to the model of the interfacing device if the querying of the interfacing device identified both the manufacturer and the model of the interfacing device.

Referring now to the drawings, wherein like reference numbers identify the same or similar parts and more particularly to FIG. 1 thereof, there is illustrated an exemplary illustration of interaction between various hardware devices and computer networks. Work station 10 is an exemplary controlling device and is arranged to store data in database 20. Camera 12 is depicted coupled to work station 10. Camera 12 illustrates an interfacing device directly coupled to work station 10 and capable of being automatically configured on or monitored by work station 10. Work station 10 is also coupled to local area network (LAN) 18. LAN 18 is coupled to POP3 server 14, SMTP server 16, printer model A 22, and gateway server 26. Printer model A 22 illustrates an interfacing device that is a network printer. SMTP server 16 is a Simple Mail Transfer Protocol (SMTP) server that operates to send mail from work stations coupled to LAN 18, such as work station 10. One of ordinarily skill in the art should recognize that a plurality of work stations may be coupled to LAN 18, and work station 10 is merely an exemplary work station. These plurality of work stations may also be controlling devices or these other work stations may rely on work station 10 for automatic configuration or monitoring of hardware devices. POP3 server 14 is a Post Office Protocol server that receives email for work station 10 and the other work stations (not shown) coupled to LAN 18. Gateway server 26 allows LAN 18 to communicate in a wide area network (WAN) 24. WAN 24 may be the interne or another type of wide area network.

LAN 34, gateway server 28, printer model B 30, SMTP server 42, POP3 server 40, work station 32, database 38, and scanner 36 are shown and are analogous to LAN 18, gateway server 26, printer model A 22, SMTP server 16, POP3 server 14, work station 10, database 20, and camera 12 respectively. These analogous devices and local area networks illustrate how two local area networks 18 and 34 can be coupled by a wide area network 24. Further, LAN 34 may include a plurality of work stations (not shown) which may be configured to operate cooperatively with interfacing devices of either LAN 18 or LAN 34.

For instance, work station 32 may be configured to operate printer model A where work station 10 may be configured to operate scanner 36. This is made possible by communication between local area network (LAN) 18 and local area network (LAN) 34 through wide area network (WAN) 24 enabled by gateway servers 26 and 28.

Scanner 36 is analogous to camera 12 as interfacing device directly coupled to work station 32. Printer model B 30 is analogous to printer model A 22 except that it is a different model and possibly a different manufacturer.

Database 20 and database 38 store information relating to various interfacing devices, such as camera 12, printer model A 22, printer model B 30, and scanner 36. Work stations 10 and 32 are in communication with other work stations (not shown) through LAN 18 and LAN 34 to communicate between these work stations (not shown) with these interfacing devices. In embodiments of the present invention, work station 10 could be the controlling device for all of the interfacing devices 12, 22, 30, and 36 shown in FIG. 1. In other embodiments of the present invention, both work station 10 and work station 32 could be controlling devices arranged to communicate over local area network (LAN) 34. Accordingly, information relating to the interfacing devices can be stored on database 38 to allow for the establishment of communication means for communication with the interfacing devices. As networks are often complex, it may be necessary for there to be several controlling devices on a network, such as work station 10 and work station 32. It is also most efficient for such controlling devices 10, 32 to exchange data to maximize the usability of interfacing devices 12, 22, 30, and 36. Accordingly, data stored on database 20 can be periodically updated on database 38 by sending email messages through SMTP server 16 and routed through LAN 18, gateway server 26, WAN 24, gateway server 28, and LAN 34 to POP3 server 40. Work station 32 may then arranged to download the email message from work station 10 through POP3 server 40. The content of the email message may include configuration data that is stored on database 20 to be copied on database 38. The work station 32 is arranged to receive an email message and automatically update database 38 based on particular communication means of email exchange that are pre-programmed in work station 10 and work station 32. Similarly, database 20 can be updated from that stored in database 38 in an identical fashion utilizing SMTP server 42, LAN 34, gateway server 28, WAN 24, gateway server 26, LAN 18, and POP3 server 14.

Figure 2:
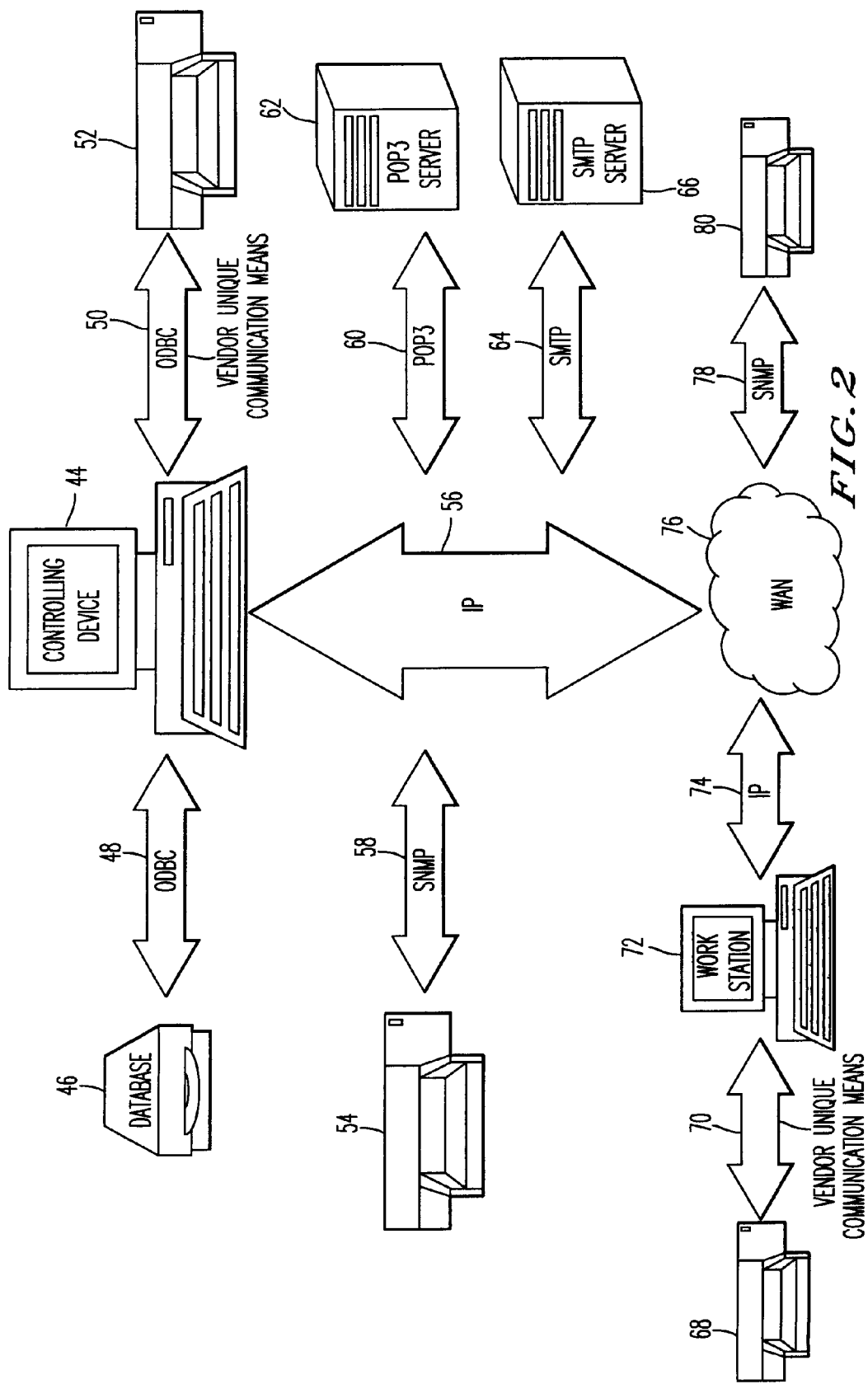
FIG. 2 illustrates different communication means that are used in the communication between different hardware devices.

FIG. 2 is an exemplary illustration of the communication means interaction between various hardware devices. Printers 52, 54, 68, and 80 are exemplary interfacing devices that are coupled to controlling device 44. These interfacing devices 52, 54, 68, and 80 communicate over Simple Network Management Protocol (SNMP) as shown by blocks 50, 58, 70, and 78. SNMP is a common communication means by which network management applications can query devices. SNMP operates at the open systems interconnection (OSI) application layer. The internet based SNMP is the basis of most network management software. SNMP was designed as UDP on IP network management protocol, that can manage virtually any network type and has been extended to include IP as routers and bridges. SNMP is widely deployed in an IP (internet protocol) environment. SNMP can be implemented over ethernet as well as OSI transport. SNMP is an Internet standard and operates on top of the internet protocol. One of ordinarily skill in the art should realize that an interfacing device does not necessarily need to communicate over SNMP, and can communicate using similar communication means. Interfacing device printer 52 communicates over vendor unique communication means 50 with controlling device 44. Interfacing device printer 54 communicates with controlling device 44 over SNMP 58 and IP 56. Printer 54 is a network printer and, therefore, is not directly coupled to the controlling device 44. Accordingly, the SNMP rides over the IP for printer 54. Interfacing device printer 80 is coupled to wide area network (WAN) 76 and communicates with controlling device 44 over SNMP 78 and IP 56 similar to printer 54. Printer 68 is directly coupled to work station 72 and communicates with the work station 72 over SNMP 70. Work station 72 communicates with WAN 76 over IP 74 and then with the communication means device over IP 56. SNMP 58, 50, 70, and 78 are all identical. IP 56 and TCP/IP 74 are also identical. Controlling device 44 communicates with database 46 over Open DataBase Connectivity (ODBC) 48. ODBC is a standard that allows databases created by various relational and non-relational database programs to be accessed by a common interfacing. Such relational and non-relational database programs include Microsoft Access, Microsoft FoxPro, and Oracle. The interface is independent of the interface file format. By relying on ODBC, one can write an application that uses the same code to read record from an Access file, for example. SMTP server 66 is arranged for sending email and is coupled to controlling device 44 over a local area network (not shown) using Simple Message Transfer Protocol (SMTP) 64 and IP 56. POP3 server 62 is arranged to receive email from controlling device 44 and communicates with controlling device 44 using POP3 60 and IP 56.

Figure 3:
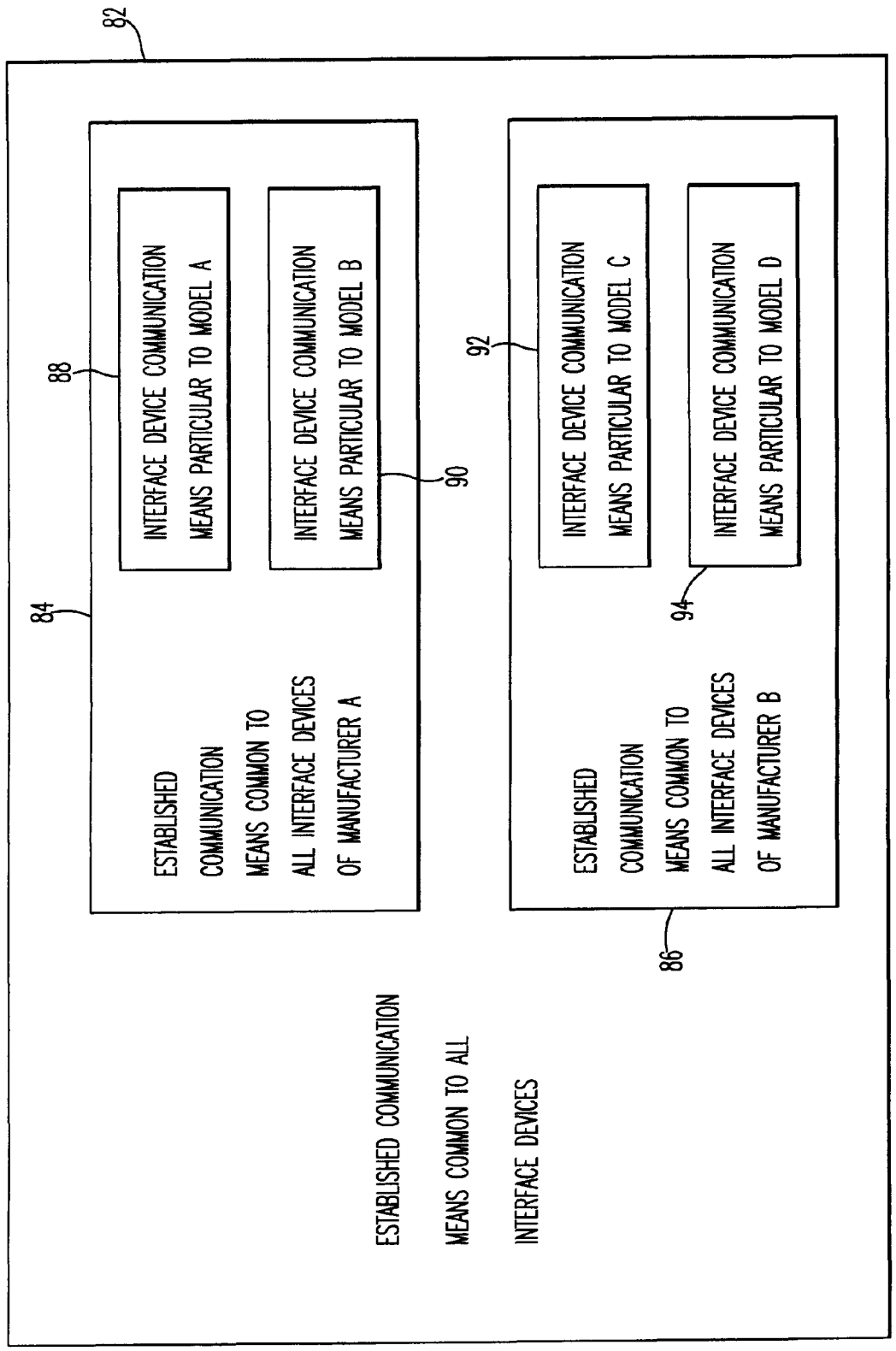
FIG. 3 illustrates a hierarchy of interface communication means.

FIG. 3 is a hierarchical relationship between established communication means for the different interfacing device models. Block 82 is the established communication means common to all interfacing devices. Blocks 84 and 86 illustrate the communication means of two exemplary manufacturers (Manufacturer A and Manufacturer B). Block 84 is the established communication means common to all interfacing devices of Manufacturer A, while block 86 is the established communication means common to all interfacing devices of manufacturer B. Blocks 84 and 86 are part of block 82. As part of block 84, blocks 88 and 90 are the communication means of different interfacing devices that have differences in communication means. Blocks 88 and 90 are part of block 84 which is part of block 82. Blocks 92 and 94 are analogous to blocks 88 and 90 but particular to exemplary manufacturer B. This diagram illustrates the hierarchy of communication means. In general, all communication means of block 82 are also common to blocks inside block 82. However, the communication means in blocks 84, 88, 90, 86, 92, and 94 are not necessarily completely compatible with the communication means in block 82.

Figure 4:
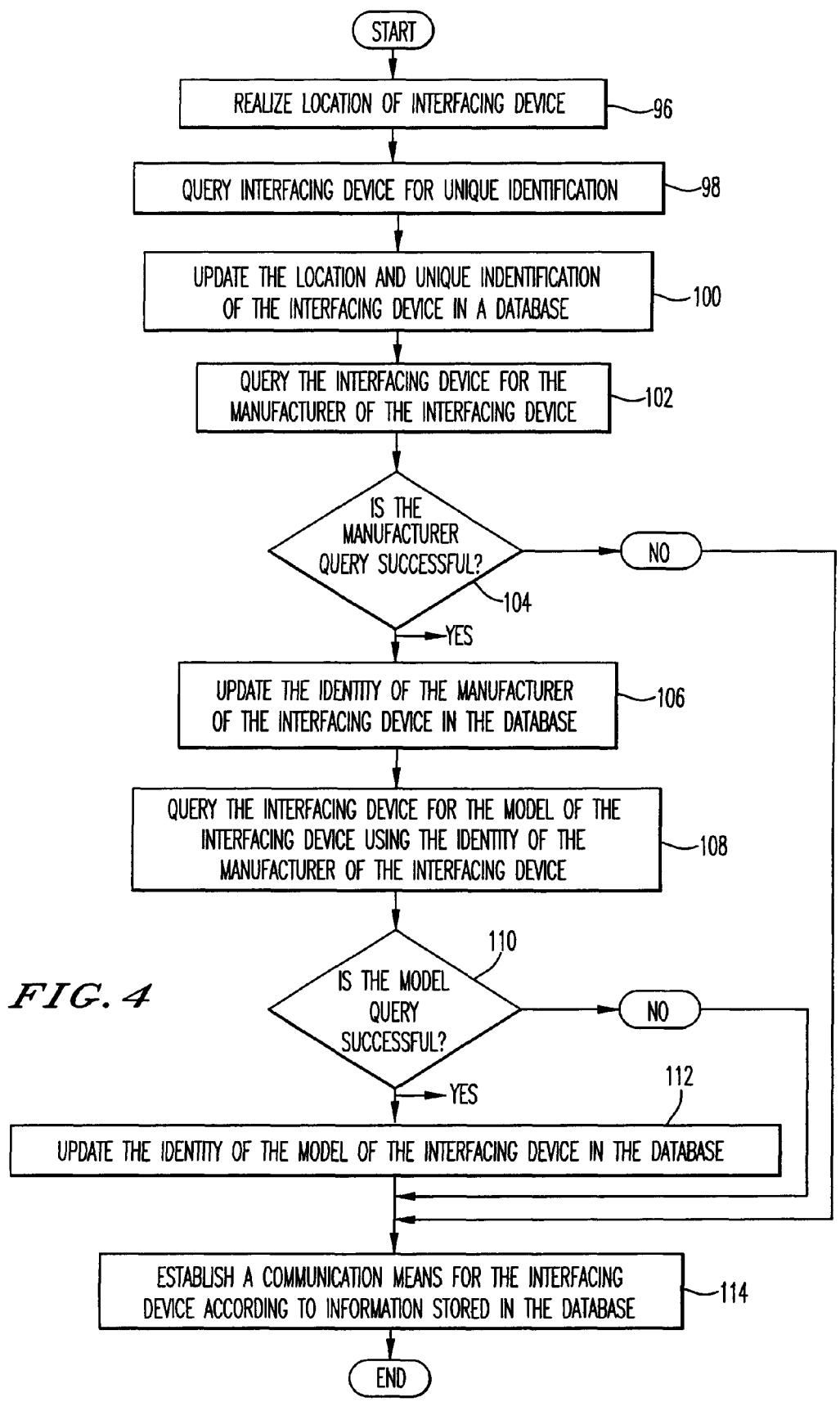
FIGS. 4 and 5 are flowcharts of the utilization of the hierarchical relationship of communication means for a controlling device to establish a communication means with an interfacing device according to two respective embodiments of the present invention.

FIG. 4 is a flowchart illustrating embodiments of the present invention in which the hierarchical relationship of communication means for a controlling device is utilized to establish a communication means for an interfacing device. Block 96 illustrates a controlling device realizing the location of the interfacing device. In embodiments of the present invention, the realizing of the location of the interfacing device is accomplished by an automatic detection that the interfacing device is electrically coupled to the controlling device. This automatic detection may be any coupling of hardware devices or hardware components. This automatic detection is often accomplished by hardware devices including software programs which monitor and track all of the input and output signals to the hardware device. Accordingly, if a new hardware device or component is coupled to such a hardware device, its presence will be detected.

In other embodiments, the step of realizing the location of interfacing devices is accomplished by an input by a user. In such embodiments, the user may input data into a controlling device which indicates that a new interfacing device has been coupled to the controlling device. Such an input may actually be a command for the interfacing device to be configured, however, the data input by the user must include the location of the interfacing device. The location of the interfacing device may be a network location of an interfacing device on a network or possibly a port on a hardware device to which the interfacing device is coupled.

In some embodiments, the location of the interfacing device may include both a port on a hardware device and the network location of the network device.

In other embodiments, the step of realizing the location of the interfacing device is accomplished by the controlling device detecting that a network location of an interfacing device has changed. In these embodiments, the controlling device may be able to identify the interfacing device, however in a different location. This different location may either be a network location, a data port on a hardware device, or a combination of both.

One of ordinarily skill in the art would realize that means for realizing location of an interfacing device can include a wide variety of events. The common feature of these events is that the controlling device becomes aware of the presence of an interfacing device. This location realization may serve the purpose of starting the process of automatic configuration or monitoring of a new device that is electrically coupled to a controlling device or may be the start of a process that confirms or updates the established communication means of an interfacing device.

Block 98 illustrates that the controlling device queries the interfacing device for the unique identification of the interfacing device. The unique identification may be a serial number, manufacturer number, MAC address or other standard code those unique to the particular interfacing device that the particular interfacing device can be identified by. This information is useful to the controlling device to identify and record an identity for the interfacing device so that the interfacing device can be referenced and universally accessed.

Block 100 shows the updating of the location and the unique identification of the interfacing device in a database. For the purposes of this discussion, a database is defined as a collection of data structured and organized in a disciplined fashion so that it is possible to quickly access information of interest. Accordingly, a database may be comprised of either volatile or non-volatile memory that can be accessed and updated for easy reference. Once the location of the interfacing device is realized in block 96, it is important to update that information for reference in the database. Further, after the query for the unique identification of the interfacing device, it is important to save that information to be referenced in the future. In some embodiments, the location and unique identification of the interfacing device are associated with one another in the database so that the interfacing device can be either referenced by its unique identification or its location on a computer or network. Likewise, in embodiments of the present invention, an identification of the interfacing device can be translated from its location to its unique identification and vice versa.

One of ordinarily skill in the art would realize that a means for updating a database with the location of an interfacing device includes any storage of network or physical location of the interfacing device for purposes of identifying where the interfacing device is located. Further, one of ordinarily skill in the art would realize that a database can include any kind of memory arranged to store data.

In block 102, the interfacing device is queried for the manufacturer of the interfacing device. One of ordinarily skill in the art would realize that a means for querying an interfacing device for the manufacturer of the interfacing device would include any communication means that would access information of the manufacturer of an interfacing device. Such a communication means may include sending a signal from the controlling device to the interfacing device and determining the manufacturer from the response received from the interfacing device. Querying of the interfacing device could also include only receiving a signal from the interfacing device which indicates the manufacturer. Further, querying the interfacing device may include analyzing signals emitted from the interfacing device which are indicative of the manufacturer of the interfacing device.

Blocks 104 and 106 illustrate the updating of the identity of the manufacturer of the interfacing device in the database if the controlling device is successful in querying the manufacturer. If the querying of the identity of the manufacturer is not successful, then the controlling device does not update the database with such information. Accordingly, if the querying of the manufacturer is unsuccessful, the process progresses to block 114, which will be discussed below. One of ordinarily skill in the art would realize that a means for updating in a database the manufacturer of an interfacing device relates to any storage of information that can be used as a reference of the manufacturer of the interfacing device.

In block 108, the interfacing device is queried for the model of the interfacing device. This querying uses the identity of the manufacturer of the interfacing device. Further, the step performed in block 108 is not performed if the manufacturer query of block 104 was unsuccessful. In embodiments of the present invention, the querying for the model utilizes the identified manufacturer of the interfacing device by using communication means that are specific to interfacing devices of the identified manufacturer. In embodiments of the present invention, the querying of an interfacing device for the model of the interfacing device includes the controlling device updating its knowledge of interfacing device communication means of a particular manufacturer, by communication with the manufacturer. Such communication may be either made by a user or automatic electronic communication to update communication means records. One of ordinarily skill in the art would realize that a means for querying an interfacing device, using the identity of the manufacturer device for the identity of the model of the interfacing device could be accomplished by any process or mechanism which utilizes the manufacturer information to help decipher the model of the interfacing device.

In blocks 110 and 112, the identity of the model of the interfacing device is updated in the database if the model query is successful. One of ordinarily skill in the art would realize that the means of updating the database with the identity of the model of the interfacing device includes any kind of storage of data that can be referenced at a later time to access the model identity of the interfacing device.

Block 114 shows that the controlling device establishes a communication means for the interfacing device according to the information stored in the database. In embodiments of the present invention, the controlling device acts on behalf of other devices coupled to the controlling device on the network. In embodiments, once the controlling device has enough information so that hardware devices can interact cooperatively with the interfacing device, it communicates such information and communication means to other hardware devices so that they can communicate with the interfacing device. In embodiments of the present invention, the controlling device configures itself based on the information stored in the database.

The information stored in the database may not comprise information as to the manufacturer of the interfacing device or the model of the interfacing device, only the manufacturer of the interfacing device, or both the model and the manufacturer of the interfacing device. Based on how much information the controlling device can access from the database about the interfacing device, the controlling device can decipher communication means for cooperative interaction with the interfacing device. Depending on what information is known about the interfacing device, communication means for the interfacing device can be identified that will allow operation of the interfacing device with at least one other hardware device. One of ordinarily skill in the art would realize that a means for controlling at least one device to interface with an interfacing device according to the information stored in a database utilizes an identified relationship between the identified model or manufacturer of the interfacing device to the communication means associated with that interfacing device.

Figure 5:
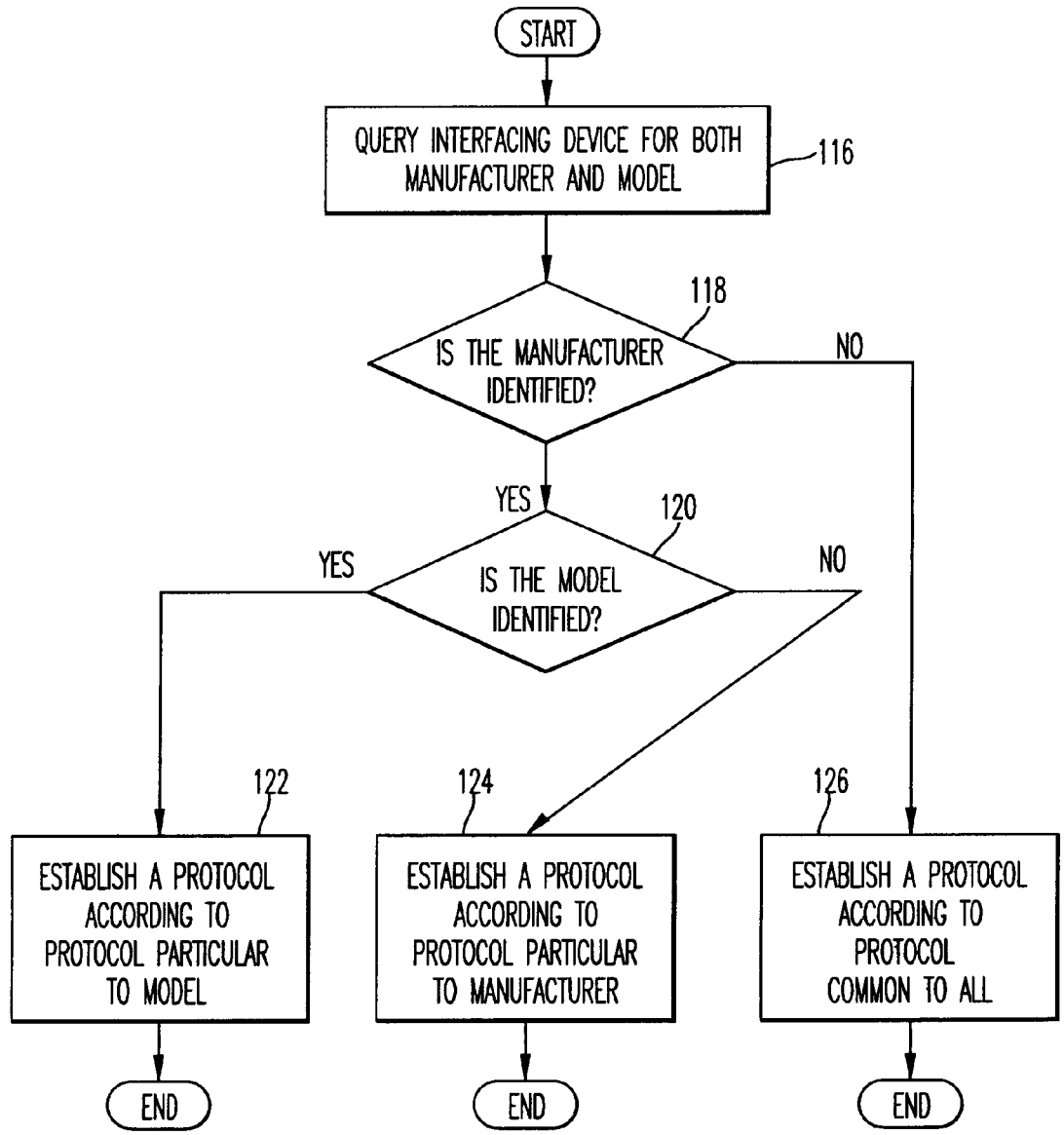

FIG. 5 is a flowchart illustrating embodiments of the present invention in which the hierarchical relationship of communication means for a device is utilized to configure a device for an interfacing device. Block 116 illustrates a controlling device querying an interfacing device for both the manufacturer and the model of the interfacing device. One of ordinary skill in the art would realize that a means for querying the interfacing device for an identity of a manufacturer and the identity of the model of the interfacing device can be accomplished by any communication means that would access information of both the manufacturer and the model of the interfacing device. Such a communication means may include sending a signal from the controlling device to the interfacing device and determining the manufacturer from the response received from the interfacing device. Querying of the interfacing device could also include only receiving a signal from the interfacing device which indicates the manufacturer and model. Further, querying the interfacing device may include analyzing signals emitted from the interfacing device which are indicative of the manufacturer of the interfacing device.

In block 118, the controlling device determines if the querying of the interfacing device identified the manufacturer of the interfacing device. If the manufacturer is identified, the process flows to block 120, which will be discussed below. If the manufacturer of the interfacing device is not identified, then it can be assumed that neither the manufacturer or the model of the interfacing device are identified by the query of the interfacing device. This is evident and apparent, as if the model of an interfacing device is identified, the manufacturer of the interfacing device is also identified. For the purposes of this patent application, the manufacturer of an interfacing device is the organization which provides customer support to the hardware. Such customer support necessarily includes the distribution of software drivers for the interfacing devices.

From block 118, if the querying of the interfacing device in block 116 does not identify either the manufacturer or the model of the interfacing device then the process flows to block 126. In block 126, the controlling device establishes a communication means for an interfacing device using a communication means that is common to all interfacing devices.

In block 120, the controlling device determines if the querying of the interfacing device identified the model of the interfacing device. If the model is identified, then the process flows to block 122, which will be discussed below. If the model is not identified, then the process flows to block 124. In block 124, the controlling device establishes a communication means for an interfacing device using a communication means that is common to all interfacing device of the manufacturer of the interfacing device.

One of ordinary skill in the art should realize that the means for establishing a communication means for an interfacing device using a communication means that is either common to all interfacing devices, common to all interfacing device of the manufacturer of the interfacing device, or a communication means that is particular to the model of the interfacing device is accomplished by any process that manipulates the communication means hierarchical of interfacing devices to maximize the functionability and usability of an interfacing device.

In block 122, the controlling device configures at least one device to interface with an interfacing device using a communication means that is particular to the model of the interfacing device.

Figure 6:
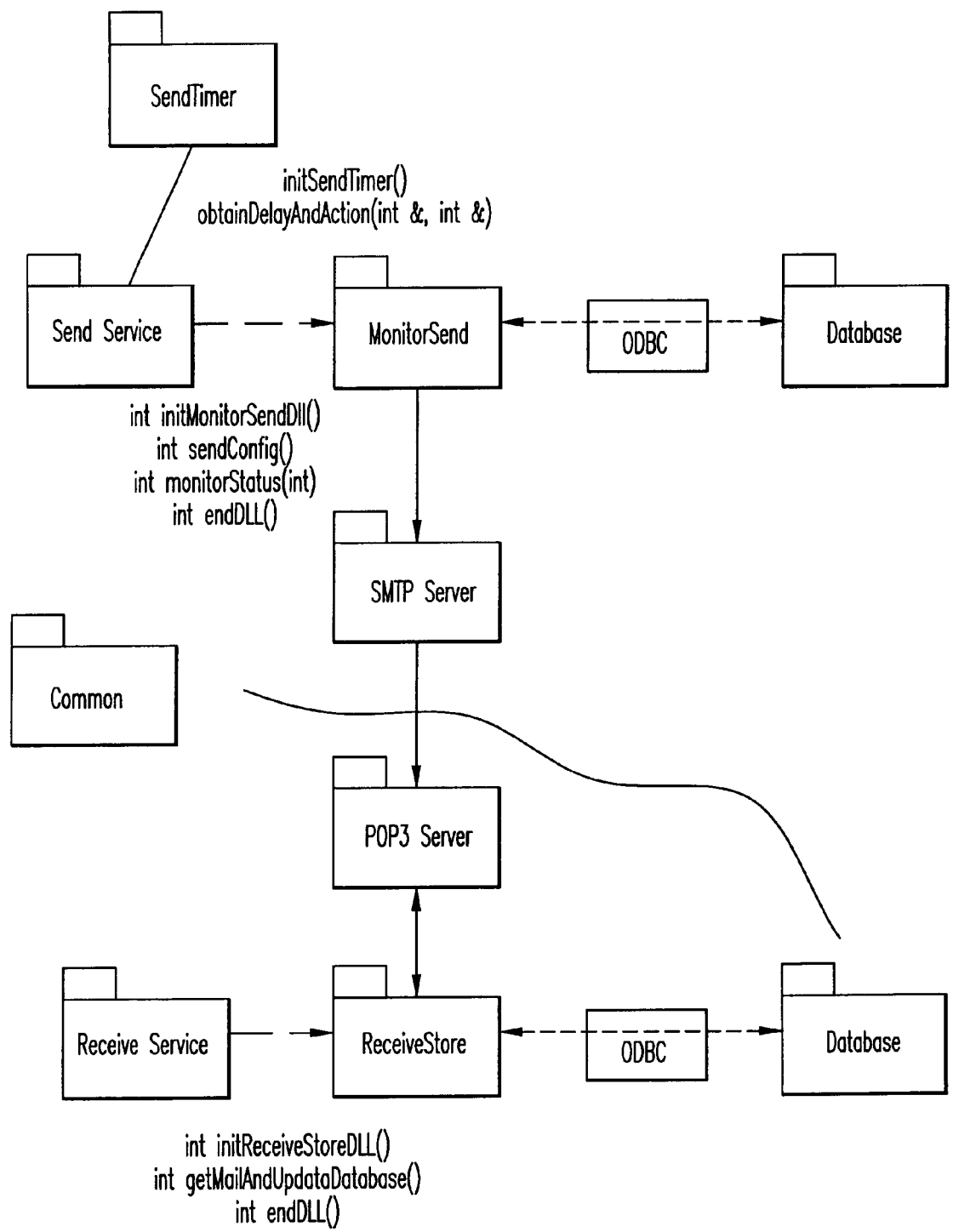
FIG. 6 illustrates an exemplary architecture of the present invention with the major interfaces of the modules.

FIG. 6 shows the major interfaces among the modules, as implemented in this exemplary architecture.

void initSendTimer (void)

This function initializes the SendTimer. In particular, this function triggers the SendTimer object to get the timing information from the registry.

void obtainDelayAndAction (int & out_nDelay, int & out_nAction)

This function returns the delay time in seconds for ::Sleep function (need to multiply 1000) and the action indicator (0 or 1).

int initMonitorSendDLL (void)

This function initializes the monitorSendDLL. In addition, it would create the devices to be monitored. The return int is the error code in which zero is defined as no error int sendConflg (void)

This function obtains the device information from ODBC and sends it. The return int is the error code in which zero is defined as no error.

int monitorStatus (int in_nAction)

This function monitors the preset information for error checking. In addition, if in_nAction is one, it will monitor additional information and send it to the destination along with storing into the local database. The return int is the error code in which zero is defined as no error.

int endDLL (void)

This function cleans up the MonitorSend DLL before closing the objects. The return int is the error code in which zero is defined as no error.

int initReceiveStoreDLL (void)

This function initializes the various parts of DLL. The return int is the error code in which zero is defined as no error.

int getMailAndUpdateDatabase (void)

This function triggers the ReceiveStore DLL to access the POP3 server to retrieve mails, to parse the retrieved mails, to delete the mails, and to store the extracted data into the database through ODBC. The return int is the error code in which zero is defined as no error.

int endDLL (void)

This function cleans up the ReceiveStoreDLL before closing the objects. The return int is the error code in which zero is defined as no error.

Figure 7:
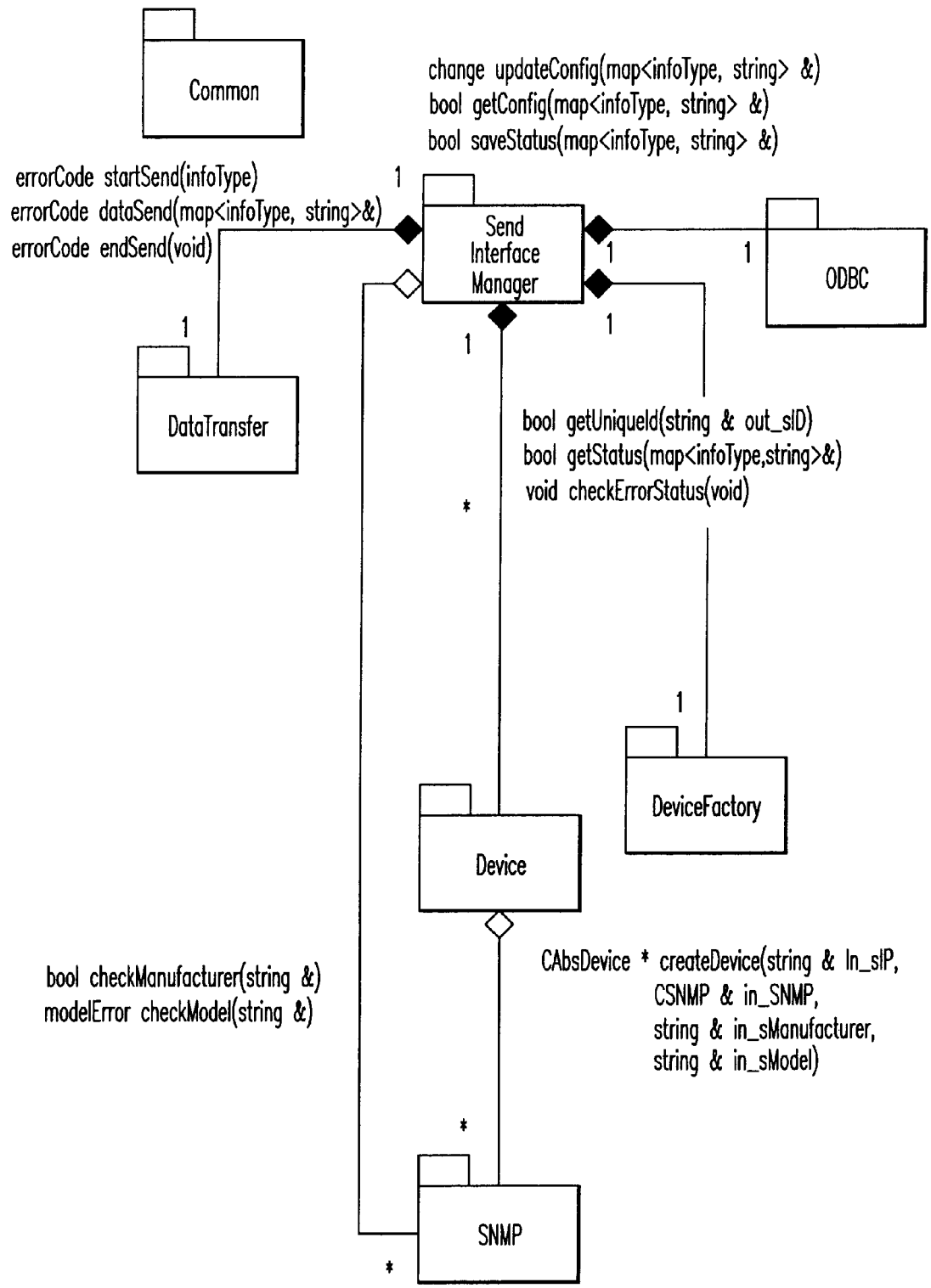
FIG. 7 illustrates the MonitorSend DLL configuration according to one exemplary implementation of the present invention.

FIG. 7 shows an overview of Monitor_Send DLL configuration according to one exemplary implementation of the present invention. The functions included in the Monitor_Send DLL package, as shown in FIG. 7, are described below:

change updateConfig(std::map<infoType, std::string>&)

This function updates the device information database of the current record in the ODBC. This function keys on IP address and Unique ID for the update purpose. This function is primarily used to add unique ID and to update the manufacturer and model if they are incorrectly assigned to the device at the IP address for MonitorSend Package. If there is no record with IP address and Unique ID, this function adds the passed data into the database. If the Unique ID exists, but IP address is changed, it will update IP address. The return value change is enum {NoChange=0, UpDateRecord, AddRecord, ChangeIPaddress}.

boot getConfig(std::map<infoType, std::string>&)

This function obtains the map from ODBC for the device information in the given format. The function returns true if there is data returned, false if there is no more data.

bool saveStatus(std::map<infoType, std::string>&)

This function saves the status information into the ODBC. The function returns true when saving is successful, false otherwise.

bool checkManufacturer(std::string&)

This function checks the passed manufacturer to be correct for the IP address. If the Manufacturer is correct, the function returns true, otherwise, it returns false and returns the correct manufacturer in the string.

modelError checkModel(std::string&)

This function checks the passed model to be correct for the IP address. ModelError is enum type with {ModelNoError=0, WrongModel, ModelInformationUnavailable}. If WrongModel is detected, the correct model name is put in the returned string.

CAbsDevice*createDevice (std::string & in_sIP, CSNMP & in_SNMP, std::string & in_sManufacturer, std::string & in_sModel)

This function creates the device of the specification in the Device Factory. The function returns the pointer to the created device if the creation is successful, 0 otherwise. The last two parameters has null strings as defaults.

bool getUniqueID (std::string & out_sID)

This function returns the unique ID from device. The function returns true if the Unique ID is returned, false otherwise.

bool getStatus (std::map<infoType, std::string>&)

This function obtains status information from a device. The function returns true when the status is returned, false when status could not be obtained. This function resets the variable that keeps the error status before returning.

void checkErrorStatus (void)

This function triggers the device to check the error status to be saved internally.

errorCode startSend (infoType)

This function triggers the Data Transfer to prepare for sending the data specified in the infoType. The function returns the errorCode.

errorCode dataSend (std::map<infoType, std::string>&)

This function in the Data Transfer sends the received data to the appropriate destination after properly formatting, encrypting and encoding. The function returns the errorCode.

errorCode endSend (void)

This function in the Data Transfer ends the data sending. The function returns the errorCode.

Figure 8:
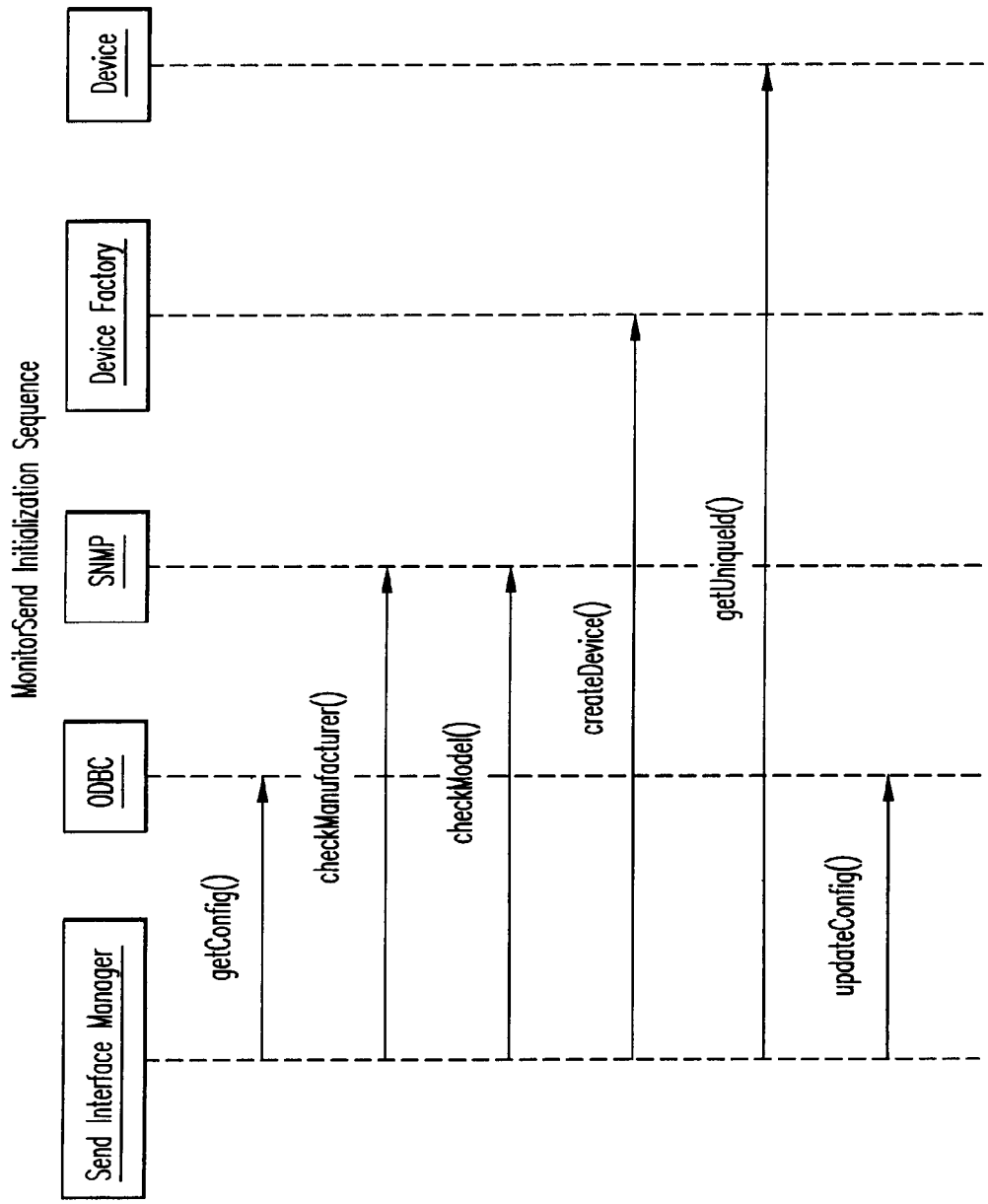
FIG. 8 illustrates the MonitorSend Initialization Sequence according to one exemplary implementation of the present invention.

FIG. 8 shows the MonitorSend Initialization Sequence, as implemented in this exemplary architecture.

Figure 9:
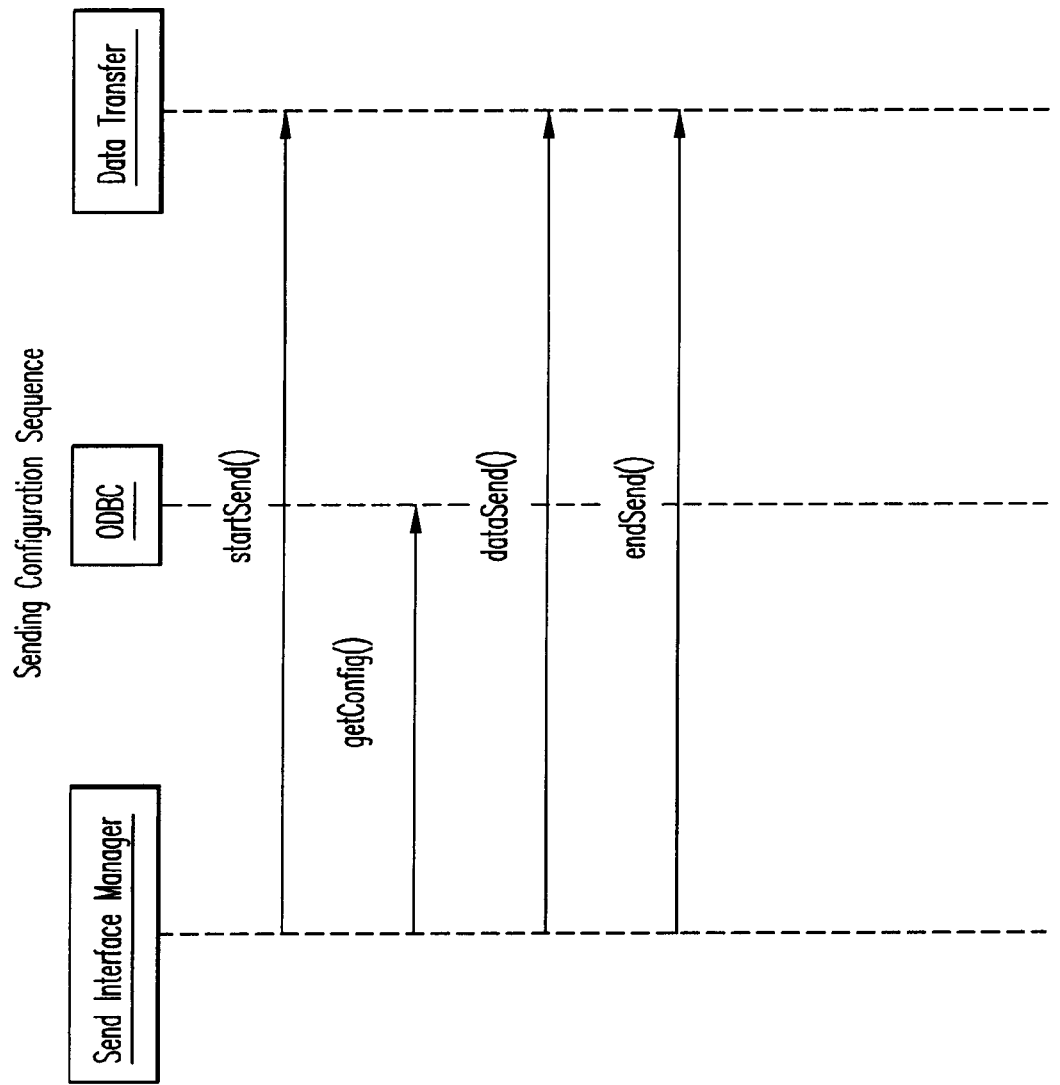
FIG. 9 illustrates the Sending Configuration Sequence according to one exemplary implementation of the present invention.

FIG. 9 shows the Sending Configuration Sequence, as implemented in this exemplary architecture.

Figure 10:
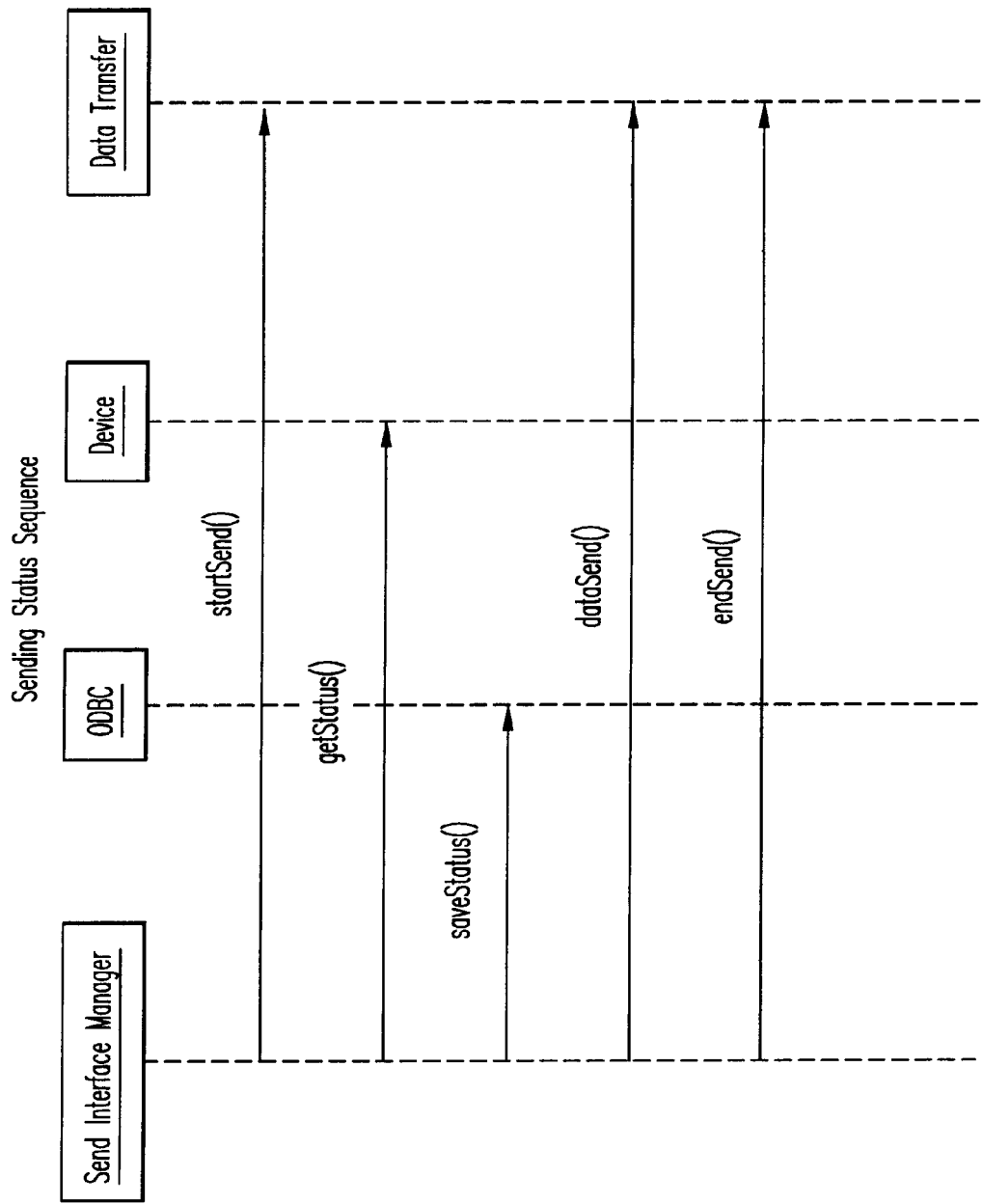
FIG. 10 illustrates the Sending Status Sequence according to one exemplary implementation of the present invention.

FIG. 10 shows the Sending Status Sequence, as implemented in this exemplary architecture.

Figure 11:
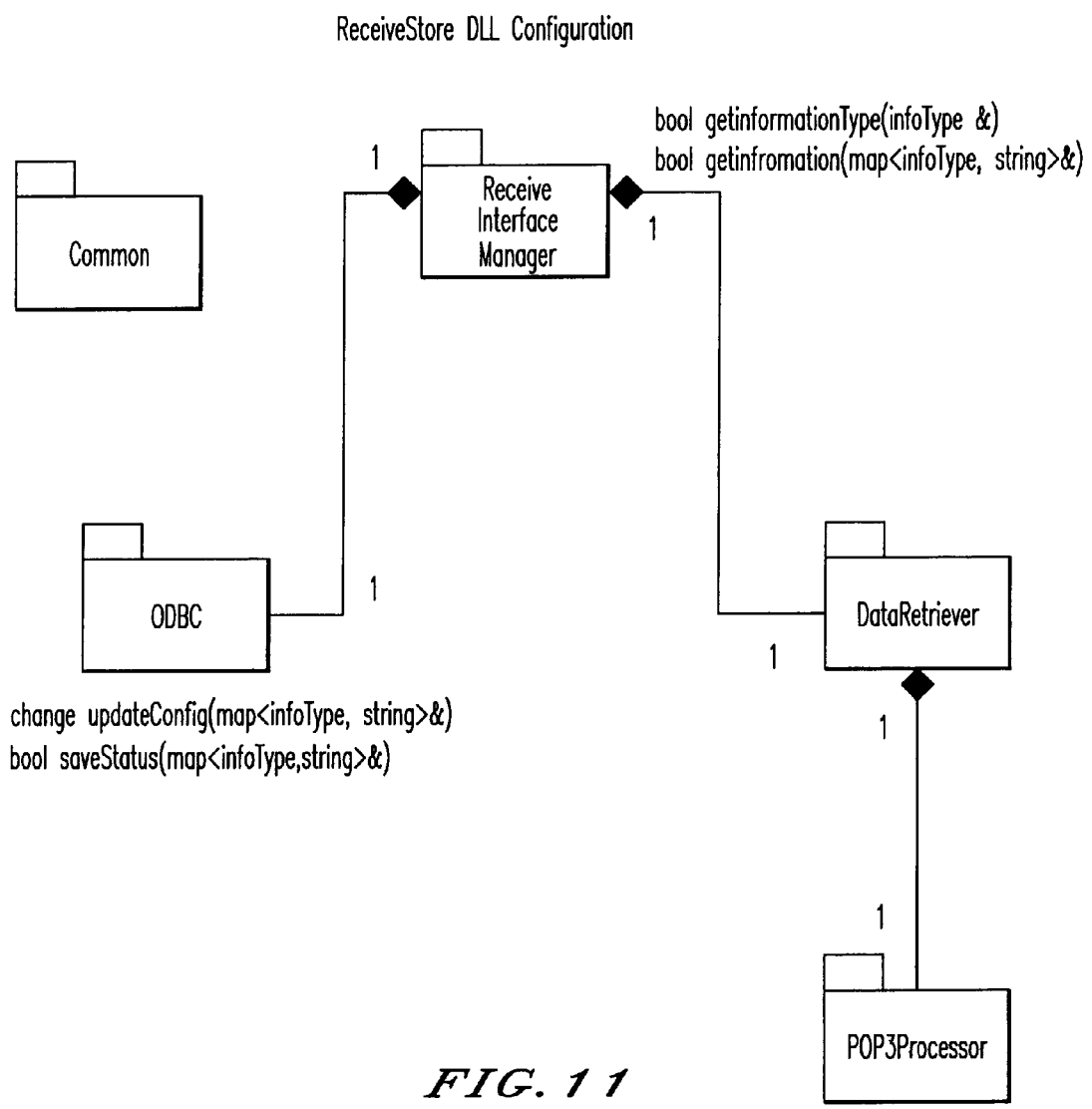
FIG. 11 illustrates the ReceiveStore DLL configuration according to one exemplary implementation of the present invention.

FIG. 11 shows an overview of ReceiveStore DLL configuration according to one exemplary implementation of the present invention. The functions included in the ReceiveStore DLL package, as shown in FIG. 11, are described below:

bool getInformationType(infoType &)

This function triggers the DataRetriever to try to obtain the POP3 data and determines the data type of the obtained email. The function returns true when the e-mail is obtained, false when no more e-mail is in POP3 server at the time.

bool getInformation(std::map<infoType, std::string>&)

This function retrieves from DataRetriever the information content of the e-mail. The function returns true when the information is returned, false when no more data set is available in the email message.

change updateConfig(std::map<infoType, std::string>&)

This function updates the device information database of the current record in the ODBC. This function keys on IP address and Unique ID for the update purpose. This function is primarily used to add unique ID and to update the manufacturer and model if they are incorrectly assigned to the device at the IP address for MonitorSend Package. If there is no record with IP address and Unique ID, this function adds the passed data into the database. If the Unique ID exists, but IP address is changed, it will update IP address. The return value change is enum {NoChange=0, UpDateRecord, AddRecord, ChangeIPaddress}.

bool saveStatus(std::map<infoType, std::string>&)

This function saves the status information into the ODBC. The function returns true when saving is successful, false otherwise.

Table 1 shows the data structure and how it reflects the information regarding one monitored device. The data structure contains the e-mail address of the contact person in addition to the telephone number. This data structure is not used currently. However, this structure reflects the database structure.

TABLE 1

| Type | Name | Description |
|---|---|---|
| std::string | m_sManufacturer | A string representing the manufacturer of the network printer. |
| std::string | m_sModel | A string representing the model of the network printer. |
| std::string | m_sUniqueID | A string representing the Unique ID of the network printer. This ID may be a serial number or MAC Address or any unique ID obtainable from the network printer. |
| std::string | m_sIPAddress | A string representing the IP Address of the network printer. |
| std::string | m_sCompanyName | A string representing the name of the company which owns the network printer. |
| std::string | m_sStreet | A string representing the street address of the company. |
| std::string | m_sCity | A string representing the city where the company is located. |
| std::string | m_sState | A string representing the state where the company is located. |
| std::string | m_sZipCode | A string representing the zip code of the company. |
| std::string | m_sLocation | A string representing the location of the network printer within the company. |
| std::string | m_sContactPerson | A string representing the name of the contact person responsible for the network printer. |
| std::string | m_sPhoneNumber | A string representing the phone number of the contact person. |
| std::string | m_sEMailAddress | A string representing the e-mail address of the contact person. |

The following section describes the major enum types used in the system.

infoType

This section describes the definition of the infoType enum at this writing. As the project progresses, more infoType values can be added. The value range 0 through 99 is assigned to the data type. The value range 100 to 499 is assigned to Device Information. The value range 500 to 999 is assigned to the common parameters and standard MIB parameters. The range 1000 to 2999 is assigned to Ricoh specific information. The range 3000 to 3999 is assigned to Xerox. The range 4000 to 4999 is assigned to Lexmark. The range 5000 to 5999 is assigned to EPSON. The range 6000 to 6999 is assigned to HP. The values are defined as follows: enum infoType {NotDefine=0, DeviceInformation, StatusInformation, Manufacturer=100, Model, UniqueID, IPAddress, CompanyName, Street, City, State, ZipCode, Location, ContactPerson, PhoneNumber, EMailAddress, DateTime=500, HrDeviceErrors, LowPaper, NoPaper, LowToner, NoToner, DoorOpen, Jammed, Offline, ServiceRequested, PrtGeneralConfigChanges, PrtLifeCount, PrtAlertDesc1, PrtAlertDesc2, PrtAlertDesc3, PrtAlertDesc4, PrtAlertDesc5, RicohEngineCounterTotal=1000, RicohEngineCounterPrinter, RicohEngineCounterFax, RicohEngineCounterCopier, XeroxYellowTonerCartridge=3000, XeroxMagentaTonerCartridge, XeroxCyanTonerCartridge, XeroxBlackTonerCartridge, XeroxPrinterCartridge}.

errorCode

This section describes the error codes defined at this writing. As the project progresses, more error codes can be added. The range 0-99 is reserved. The range 100-199 is for SMTP, 200-299 is for POP3 and 300-399 is for Socket. The other range shall be defined if needed. enum errorCode(NoError=0, UnknownError=1, SendHeloCommandFailed=100, SendMailCommandFailed, SendRcptCommandFailed, SendDataCommandFailed, SendDataFailed, SendQuitCommandFailed, SendUserCommandFailed=200, SendPassCommandFailed, SendStatCommandFailed, SendRetrCommandFailed, SendDeleCommandFailed, SendQuitPop3CommandFailed, CreateSocketFailed=300, ConnectSocketFailed);

The foregoing description of the preferred embodiment of the present invention has been presented for purposes of illustration and description. It is not intended to be exhaustive or to limit the invention to the precise form disclosed, and many modifications or variations are possible in light of the above teaching. For example, any one or more of the concepts described or shown herein may be applied to the system and/or method disclosed in related application Ser. No. 09/756,120, now abandoned. Moreover, any concept or feature described in related application Ser. No. 09/756,120, now abandoned may be applied to the systems or methods disclosed herein. The embodiments were chosen and described to best explain the principles of the invention and its practical applications thereby enable others skilled in the art to utilize the invention and various embodiments and with various modifications as are suited to the particular use contemplated. It is intended that the scope of the present invention be defined only by the claims appended hereto.

What is claimed:

1. A method of monitoring a printing device connected to a network by a monitoring device, comprising:
   storing an initial manufacturer and initial model of the printing device;
   storing a network address of the printing device within the network;
   obtaining the stored network address of the printing device;
   querying the printing device for an identity of a manufacturer of the printing device if the printing device is accessible at the obtained network address;
   updating in a first database the manufacturer of the printing device, if the querying for the identity of the manufacturer of the printing device is successful, the updating includes replacing the initial manufacturer with the manufacturer supplied by the printing device;
   querying the printing device, utilizing the identity of the manufacturer of the printing device, for an identity of a model of the printing device, if the querying of the printing device for the identity of the manufacturer of the printing device is successful, wherein obtaining the model is dependent upon previously obtaining the manufacturer;
   updating in the first database the identity of the model of the printing device, if the query for the identity of the model of the printing device is successful, the updating includes replacing the initial model with the model supplied by the printing device;
   establishing a communication protocol that the monitoring device uses to communicate with the printing device, said establishing of the communication protocol being dependent upon the manufacturer and model included in the first database after updating of the manufacturer and the model of the printing device;
   obtaining status of the printing device using the communication protocol; and
   sending the updated information of the first database to a second monitoring device via a network using an internet application layer protocol.

2. The method of claim 1, wherein if the querying of the printing device for the identity of the manufacturer of the printing device is successful and the querying of the printing device for the identity of the model of the printing device is unsuccessful, then the step of establishing a communication protocol comprises establishing a printing communication protocol that is common to all devices manufactured by the manufacturer of the printing device.

3. The method of claim 1, wherein if the querying of the printing device for the identity of the manufacturer of the printing device is unsuccessful and the querying of the printing device for the identity of the model of the printing device is unsuccessful, then the step of establishing communication protocol comprises establishing a printing communication protocol that is common to all devices.

4. The method of claim 1, wherein if the querying of the printing device for the identity of the manufacturer of the printing device is unsuccessful and the querying of the printing device for the identity of the model of the printing device is unsuccessful, then the step of establishing a communication protocol comprises establishing a printing communication protocol that is common to at least one manufacturer of printing devices.

5. The method of claim 1, wherein if the querying of the printing device for the identity of the manufacturer of the printing device is successful and the querying of the printing device for the identity of the model of the printing device is unsuccessful, then the step of establishing a communication protocol comprises establishing a printing communication protocol that is common to at least one known model of the identified manufacturer of the printing device.

6. The method of claim 1, wherein the step of querying the printing device for the identity of the model of the printing device utilizes the identity of the manufacturer of the printing device to query the printing device with model identification codes that are particular to the manufacturer of the printing device.

7. The method of claim 1, further comprising querying the printing device for unique identification of the printing device prior to the step of querying the printing device for the identity of the manufacturer of the printing device.

8. The method of claim 7, wherein the unique identification of the printing device is a unique sequence of data designated to the printing device by the manufacturer of the printing device.

9. The method of claim 7, further comprising updating the unique identification of the printing device in the first database.

10. The method of claim 1, wherein the printing device is queried for the manufacturer and model using Simple Network Management Protocol.

11. The method of claim 1, further comprising automatically detecting that the printing device is electrically coupled to the monitoring device.

12. The method of claim 1, further comprising obtaining the network address by an input by a user.

13. The method of claim 1, wherein the monitoring device and the printing device are networked computer devices coupled to one another by a network.

14. The method of claim 13, further comprising detecting, by the monitoring device, that the network address of the printing device has changed.

15. The method of claim 1, wherein the first database can be accessed by an interface that is independent of a file format of the database.

16. The method of claim 15, wherein the first database complies with the ODBC standard.

17. The method of claim 1, wherein at least a portion of the first database is duplicated on a second database.

18. The method of claim 17, wherein the second database is updated with at least a portion of the first database by utilizing transfer of data through email.

19. The method of claim 18, wherein the transfer of data through email utilizes a Simple Mail Transfer Protocol (SMTP) means.

20. A monitoring device for monitoring a printing device connected to a network, the monitoring device comprising:
- a memory device configured to store computer executable instructions; and
- a processor configured to execute the computer executable instructions in order to,
- obtain a network address of the printing device within the network,
- query the printing device for an identity of the manufacturer of the printing device if the printing device is accessible at the network address,
- update in a database the identity of the manufacturer of the printing device, if the monitoring device is able to obtain the identity of the manufacturer of the printing device, the updating includes replacing an initial manufacturer stored in the database with the manufacturer supplied by the printing device,
- query the printing device, utilizing the identity of the manufacturer, for an identity of a model of the printing device if the monitoring device is able to obtain the identity of the manufacturer of the printing device, wherein obtaining the model is dependent upon previously obtaining the manufacturer
- update in the database the identity of the model of the printing device, if the monitoring device is able to obtain the identity of the model of the printing device, the updating includes replacing an initial model stored in the database with model supplied by the printing device,
- establish a communication protocol that the monitoring device uses to communicate with the printing device, said establishment of the communication protocol being dependent upon the manufacturer and model included in the first database after updating of the manufacturer and model of the printing device,
- obtain status of the printing device using the communication protocol, and
- sending the updated information to a second monitoring device via a network using an interne application layer protocol.

21. A monitoring device for monitoring a printing device connected to a network, the monitoring device comprising:
- means for storing an initial manufacturer and model of the printing device;
- means for obtaining a network address of the printing device within the network;
- means for querying the printing device for the identity of a manufacturer of the printing device if the printing device is accessible at the network address;
- means for updating in the database the manufacturer of the printing device, if the querying for the identity of the manufacturer of the printing device is successful, the updating includes replacing the initial manufacturer with the manufacturer supplied by the printing device;
- means for querying the printing device, utilizing the identity of the manufacturer of the printing device, for an identity of a model of the printing device, if the querying of the printing device for the identity of the manufacturer of the printing device is successful, wherein obtaining the model is dependent upon previously obtaining the manufacturer;
- means for updating in the database the identity of the model of the printing device, if the query for the identity of the model of the printing device is successful, the updating includes replacing the initial model with the model supplied by the printing device;
- means for establishing a communication protocol that the monitoring device uses to communicate with the printing device, said establishing of the communication protocol being dependent upon the manufacturer and model included in the first database after updating of the manufacturer and model of the printing device;
- means for obtaining status of the printing device using the communication protocol; and
- means for sending the updated information to a second monitoring device via a network using an internet application layer protocol.

* * * * *